United States Patent [19]
Steiger

[11] 3,945,303
[45] Mar. 23, 1976

[54] HYDROSTATIC PISTON MACHINE

[75] Inventor: Anton Steiger, Illnau, Zurich, Switzerland

[73] Assignee: Sulzer Brothers Ltd., Winterthur, Switzerland

[22] Filed: Oct. 7, 1974

[21] Appl. No.: 512,851

[30] Foreign Application Priority Data
Oct. 10, 1973 Switzerland.................... 14410/73

[52] U.S. Cl. .................... 92/58; 91/488; 92/72; 92/148; 92/159; 92/181 R
[51] Int. Cl.² .......................................... F01B 13/06
[58] Field of Search .......... 92/58, 72, 181 R, 181 P, 92/148, 159, 488

[56] References Cited
UNITED STATES PATENTS

| | | | |
|---|---|---|---|
| 3,153,987 | 10/1964 | Thoma............................. | 92/181 R X |
| 3,255,706 | 6/1966 | Eickmann......................... | 92/58 X |
| 3,277,834 | 10/1966 | Eickmann......................... | 92/181 R X |
| 3,304,883 | 2/1967 | Eickmann......................... | 92/58 X |
| 3,724,334 | 4/1973 | Denker............................ | 92/58 X |
| 3,785,250 | 1/1974 | Steiger............................ | 92/72 |
| 3,861,278 | 1/1975 | Forster............................ | 92/181 R X |

Primary Examiner—Martin P. Schwadron
Assistant Examiner—Abraham Hershkovitz
Attorney, Agent, or Firm—Kenyon & Kenyon Reilly Carr & Chapin

[57] ABSTRACT

The bearing surface of each piston is provided with hydrostatic pressure medium during operation to maintain the axis of the piston perpendicular to the guide surface. The pressure medium is supplied through throttle passages which terminate in feed openings at the corners or at uniformly distributed points remote from the piston axis. Cooperating guide ledges are also provided on each foot and on the guide member to prevent the piston bearing surfaces from falling away from their respective guide surfaces of the guide member.

6 Claims, 6 Drawing Figures

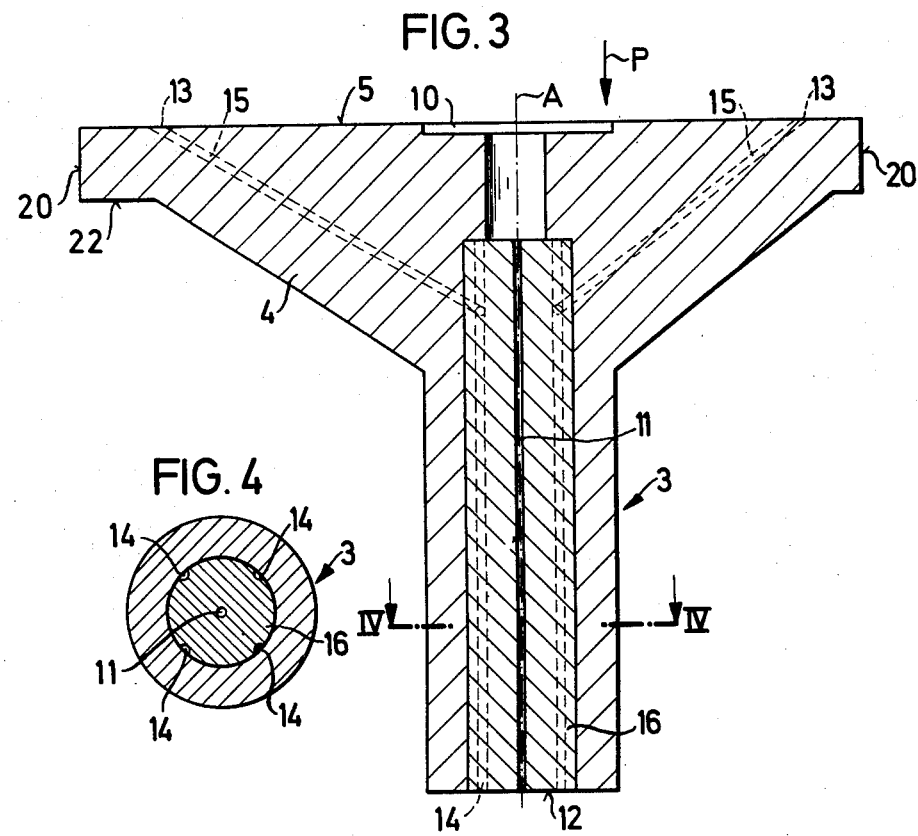
FIG. 3
FIG. 4
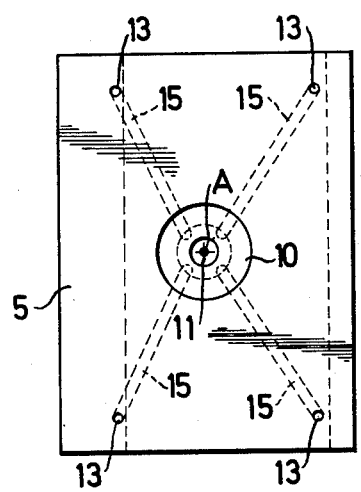
FIG. 5
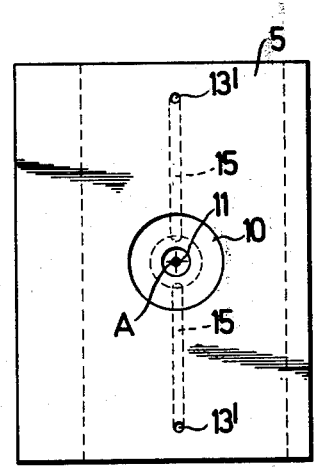
FIG. 6

HYDROSTATIC PISTON MACHINE

This invention relates to a hydrostatic piston machine.

Heretofore, various hydrostatic piston machines have been known in which pistons are slidably mounted in the periphery of a cylinder block against a surrounding rotatable guide member having flat guide surfaces for the bearing end surfaces of the pistons. As is known, the cylinder and guide member are eccentric to each other so that the pistons move in and out as the guide member rotates relative to the cylinder block. Generally, each piston has a foot at the outer end on which the bearing surface is formed. A piston machine of this kind is disclosed, for example, in German Offenlegungsschrift No. 2,134,944. This known machine, however, requires a guide mechanism which allows radial movements of the cylinder block in relation to the guide member but prevents any relative rotation. The disadvantage of this guide mechanism, which is a complication of the machine, is that it is a superfluous factor in the construction of the piston guide and, more particularly, leads to the risk of the pistons jamming in the cylinder bores of the cylinder block. Also, the guide mechanism cannot take Coriolis accelerations which occur on each revolution of the machine and make the pistons tend to tilt with respect to their cylinders with simultaneous tilting of the bearing surfaces of the feet with respect to their guide surfaces. These accelerations result in forces which may have a detrimental effect on the operation of the machine.

Accordingly, it is an object of the invention to provide a piston machine in which the axes of the pistons are maintained perpendicular to their associated guide surfaces so that the piston feet can always be satisfactorily supported hydrostatically on the guide surfaces.

It is another object of the invention to dispense with the need for a guide mechanism between the cylinder block and guide member.

It is another object of the invention to make the guided length of the pistons of a hydrostatic piston machine very short.

It is another object of the invention to provide a hydrostatic piston machine of compact construction.

It is another object of the invention to provide a hydrostatic piston machine capable of absorbing Coriolis accelerations.

Briefly, the invention provides a hydrostatic piston machine having a guide member with guide surfaces, a cylinder block rotatably mounted within the guide member about an axis of rotation eccentric to the axis of the guide member, pistons in the cylinder block and a hydrostatic stabilizing means in each piston for maintaining the axis of the piston perpendicularly of an adjacent guide surface of the guide member during operation.

The guide surfaces of the guide member are plane and are disposed tangentially of a common circle eccentric to the cylinder block axis. In addition, each piston has a foot at an outer end on which a bearing surface is formed. Preferably, the piston bearing surfaces are rectangular and their major dimension is disposed in the peripheral direction of the machine. Also, each foot has at least one guide ledge which extends in the peripheral direction of the machine and which cooperates with a guide ledge on the guide member to ensure that the bearing surfaces do not move away from the guide surfaces under unfavorable operating conditions. This prevents the pistons from tilting and the bearing surfaces from lifting away from the guide surfaces even under unfavorable operating conditions if, for example, the hydrostatic stabilization means is inoperative because of inadequate pressure of the hydraulic medium.

For purposes of hydrostatic stabilization, each bearing surface is provided with feed openings for the hydraulic pressure medium. These openings are situated in a uniform distribution pattern at points of the feet remote from the piston axis and are connected to the inner endface of the piston by separate throttle passages. The feed openings may, for example, form hydrostatic bearing pockets which are situated outside the piston axis. In a preferred arrangement, the bearing surfaces in the region of the piston axis are provided with a hydrostatic bearing pocket which is concentric therewith and which serves to receive an appreciable part of the axial load of the piston. The pocket also communicates with the endface of the piston via a throttle passage. Also, the feed openings are disposed in the corner zones of the rectangular bearing surfaces.

With such an arrangement, the main load from the piston force is taken directly in the region of the piston axis. The central bearing pocket may be surrounded by a wide supporting surface which, on the one hand, greatly reduces the hydraulic losses due to escaping oil while, at the same time, preventing a metal contact between the piston bearing surface and the guide member guide surface under unfavorable operating conditions, for example low cylinder pressure, by the pinch effect of the oil situated between the surfaces. The pressure medium supplied via the feed openings ensures the required stabilization, a favorable factor being that these openings may be situated at a considerable distance from the piston axis and thus have a large lever arm. As a result, the moment of the hydraulic force is increased while at the same time there is a large change of gap in the event of the piston assuming a skew position.

The feet of the pistons may be provided with lateral guide surfaces which extend in the direction of the major dimension of the bearing surfaces, are parallel to one another, are perpendicular to the bearing surfaces and are guided along corresponding guide surface of the guide member. The pistons are thus guided in the tangential direction of the machine while any jamming or tilting is prevented.

Passages for the discharge of hydraulic pressure medium may be formed in the region of a fillet between the plane guide surfaces and the lateral guide surfaces of the guide member. This allows the pressure medium serving for the hydrostatic support of the piston foot to flow away unhindered on all sides of the piston foot.

Preferably, the throttle passages may be formed in a pin which is secured in the piston. In this case, the throttle passages have the bearer pocket and hydrostatic stabilizing feed openings connected thereto in a suitable manner. This simplifies the production of the throttle passages while at the same time allowing the possibility of a simple alteration of the cross-section of the throttle passages, for example by replacing or remachining the pin.

These and other objects and advantages of the invention will become more apparent from the following detailed description and appended claims taken in conjunction with the accompanying drawings in which:

FIG. 1 schematically illustrates a partial section of a piston machine according to the invention viewed in the axial direction of the cylinder block and guide member;

FIG. 3 illustrates a sectional view of the piston of FIG. 2 to an enlarged scale;

FIG. 4 illustrates a view taken on line IV—IV of FIG. 3;

FIG. 5 illustrates a smaller-scale view of the piston in FIG. 4 viewed in the direction of arrow P; and FIG. 6 illustrates a similar view to FIG. 5 showing another embodiment of the piston according to the invention.

Figure 1:
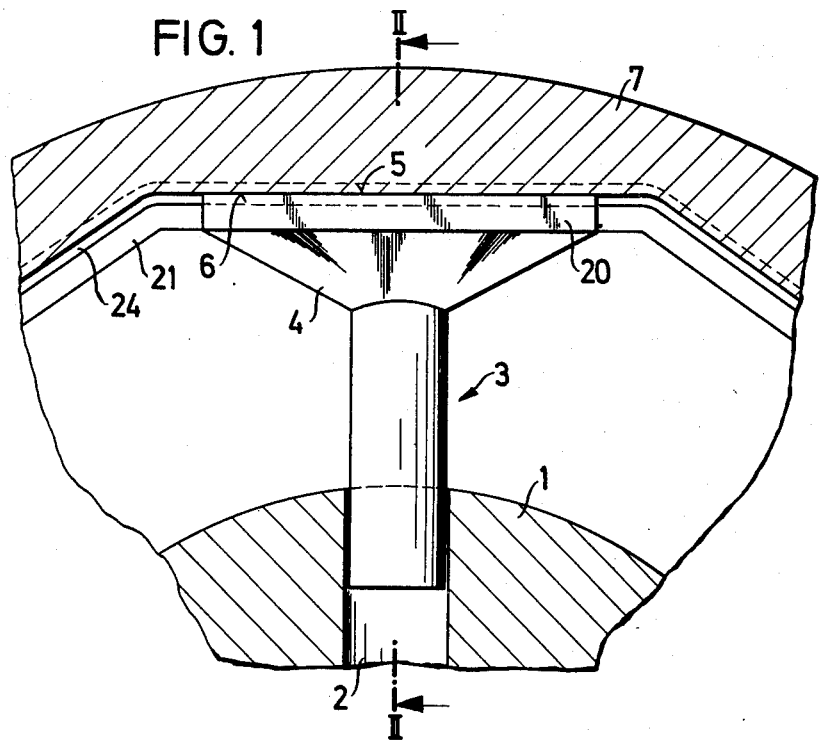

Referring to FIG. 1, the hydrostatic piston machine is of a type described in German Offenlegungsschrift No. 2,134,944 and has a cylinder block 1 including a plurality of radial cylinder bores 2 in the periphery in which pistons 3 are movably mounted. Each piston 3 has a foot 4 at the outer end which includes a plane bearing surface 5.

A guide member 7 of drum shape is rotatably mounted about the cylinder block 1 as is known and includes guide surfaces 6 for guiding each bearing surface 5 of a piston 3. The guide member 7 is rotatable about an axis parallel to the axis of the cylinder block 1 but eccentrically spaced therefrom. When the guide member 7 and the cylinder block 1 rotate jointly about their axes during operation, reciprocating movements of the pistons 3 occur in the cylinder bores 2.

As will be apparent from FIGS. 3, 4 and 5, the foot 4 of each piston 3 is provided with a central hydrostatic bearer pocket 10 which communicates via a throttle passage 11 with an inner endface 12 of the piston 3 and, hence, a cylinder chamber of the cylinder bore 2.

In order to stabilize the pistons 3 during operation of the machine, a hydrostatic stabilizing means is provided. This includes feed openings 13 in each piston bearing surface 5 at the corner zones of the foot 4 which communicate via throttle passages 14 with the cylinder chamber of the bore 2. As shown in FIGS. 3 and 4, the throttle passages 11, 14 are formed in a pin 16 secured in the piston 3.

The foot 4 and the bearing surface 5 are rectangular, the major dimension of the foot 4 being disposed in the peripheral direction of the machine. This arrangement gives very great stability to the piston 3 in the peripheral direction of the machine such as is required for relative guidance of the cylinder block 1 and of the guide member 7 during operation.

The piston 3 has an axis A which during operation is perpendicular to its associated guide surface 6 of the guide member 7.

With a piston of this construction, the force acting on the piston endface 12 is taken directly by the hydrostatic cushion of the pocket 10. This pocket 10 is surrounded by a relatively large bearing surface 5 which, together with the guide surface 6 of the guide member 7, forms a bearing gap which contains the pressure medium, for example oil, during operation. As a result of the large supporting surface, only a little oil can flow out of the pocket 10 through the long gap.

The feed openings 13, from which pressure oil can also emerge, serve to stabilize the piston 3 with respect to the guide member 7. These openings 13 are on a large lever arm with respect to the axis of the piston 3 to produce a large bearing moment.

Figure 2:
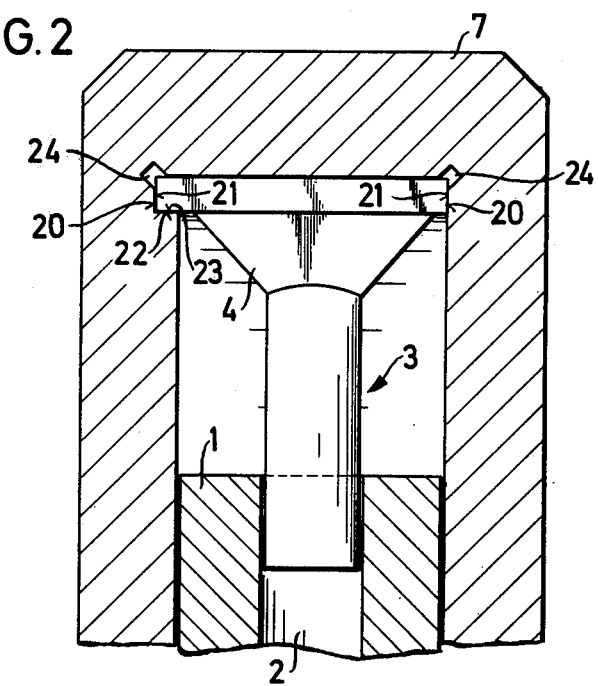
FIG. 2 illustrates a view taken on line II—II of FIG. 1.

Referring to FIGS. 1, 2 and 3, the foot 4 of each piston 3 is provided with lateral guide surfaces 20 which cooperate with corresponding guide surfaces 21 of the guide member 7. The guide surfaces 20 serve to guide the piston foot 4 in parallel relationship in the guide member 7. A guide ledge 22 is also formed on at least one side of the piston foot 4 and cooperates with a ledge 23 of the guide member 7. The ledges 2 and 23 prevent the piston foot 4 from lifting or tilting laterally from the guide surface 6. There is a risk of such movement when the machine is idling at high speeds since the pistons are subject to high acceleration forces during this time while there is a low pressure operative in the cylinder 2.

Referring to FIGS. 1 and 2, discharge passages 24 are formed in the region of the fillet between the guide surface 6 and the lateral guide surfaces 21 of the guide member 7. These passages 24 serve to discharge the pressure medium energing laterally through the gap between the surfaces 5 and 6. The passages 24 ensure that oil leaves without obstruction so that the hydrostatic stabilizing means, i.e., foot support system, operates satisfactorily.

Although FIGS. 3 and 5 show a piston embodiment with four openings 13 for lateral support of the piston by means of the hydrostatic fluid pressure, the hydrostatic stabilizing system may, of course, be embodied in some other way. As shown in FIG. 6, in principle just two openings 13' are sufficient. These openings are disposed laterally of the axis A of the piston 3 with respect to the peripheral direction of the machine. Of course, the central pocket 10 may also be omitted and be replaced, for example, by two or more pockets which may be situated, for example, at the positions of the openings 13, 13'.

What is claimed is:

1. A hydrostatic piston machine comprising
    a guide member having an axis and a plurality of internal plane guide surfaces thereon, said guide surfaces being disposed tangentially of a common circle;
    a cylinder block mounted within said guide member about an axis eccentric to the axis of said common circle;
    a plurality of pistons movably mounted in the periphery of said block in a radiating pattern, each said piston having a foot at an outer end including a plane rectangular bearing surface guided along a respective one of said guide surfaces of said guide member, each said piston having an axis disposed perpendicularly of said respective guide surface; and
    a hydrostatic stabilizing means in said bearing surface of each said piston for maintaining said axis of each said piston perpendicularly of said respective guide surface during operation, said means including a hydrostatic bearing pocket concentric to said piston axis, a plurality of feed openings in corner zones of said bearing surface, a throttle passage communicating said pocket with an inner end face of said respective piston and a plurality of throttle passages for a flow of hydraulic pressure medium extending through a respective piston from said inner end face and terminating in said feed openings.

2. A hydrostatic piston machine as set forth in claim 1 wherein each said bearing surface has a major dimension in the peripheral direction of said machine and each said foot has at least one guide ledge extending in said direction and wherein said guide member includes a guide ledge adjacent each respective guide ledge of a respective foot to prevent said bearing surface of said respective foot from moving away from a respective guide surface.

3. A hydrostatic piston machine as set forth in claim 1 wherein each foot has a pair of parallel lateral guide surfaces perpendicular to said bearing surface thereof, and said guide member has a corresponding pair of lateral guide surfaces guiding said guide surfaces of each piston therealong.

4. A hydrostatic piston machine as set forth in claim 3 which further comprises fillets between said plane guide surfaces and said lateral guide surfaces of said guide member and discharge passages for discharging hydraulic pressure medium in the region of said fillets.

5. A hydrostatic piston machine as set forth in claim 1 wherein said throttle passages are each formed in a pin secured within each said piston.

6. A hydrostatic piston machine as set forth in claim 1 wherein said feed openings are uniformly distributed at points of each respective foot remote from said piston axis thereof.

* * * * *